United States Patent [19]

Shah

[11] Patent Number: 6,134,277
[45] Date of Patent: Oct. 17, 2000

[54] SYSTEM AND METHOD FOR SELF-ADAPTIVE MAXIMUM LIKELIHOOD SEQUENCE DETECTION

[75] Inventor: Ali R. Shah, Dallas, Tex.

[73] Assignee: Ericsson Inc, Research Triangle Park, N.C.

[21] Appl. No.: 08/923,675

[22] Filed: Sep. 4, 1997

[51] Int. Cl.$^7$ .............................. H03D 1/00; H04L 27/06; H04L 5/12; H04L 23/02
[52] U.S. Cl. ......................... 375/341; 375/262; 375/348; 371/43.3; 371/43.6; 371/43.7; 371/43.8
[58] Field of Search .................................. 375/341, 262, 375/348; 371/43.3, 43.6, 43.7, 43.8

[56] References Cited

U.S. PATENT DOCUMENTS

| | | | |
|---|---|---|---|
| 3,457,562 | 7/1969 | Fano | 340/347 |
| 3,815,028 | 6/1974 | Rabow | 375/341 |
| 4,669,084 | 5/1987 | Hartman et al. | 371/43 |
| 4,710,746 | 12/1987 | Shimoda et al. | 340/347 |
| 5,029,186 | 7/1991 | Maseng et al. | 375/341 |
| 5,136,593 | 8/1992 | Moon et al. | 371/43.8 |
| 5,263,033 | 11/1993 | Seshadri | 371/43.4 |
| 5,272,726 | 12/1993 | Furuya et al. | 375/341 |
| 5,329,536 | 7/1994 | Darmon et al. | 371/43 |
| 5,432,818 | 7/1995 | Lou | 375/324 |

FOREIGN PATENT DOCUMENTS 0 355 850   8/1989   European Pat. Off. .

OTHER PUBLICATIONS

Long and Bush, Decision–Aided Sequential Intersymbol Interference Sequence Estimation For Channels, IEEE Intl. Conf. on Communications, vol. 2, Jun. 1989, pp. 841–845.

Lin and Costello, Jr., Error Control Coding, Prentice–Hall, Inc., 1983, pp. 350–365.

Paris and Shah, Tree Search Algorithms for Self–Adaptive Maximum–Likelihood Sequence Estimation, Proceedings IEEE International Symposium on Information Theory, Sep. 1995, p. 405.

Moon and Carley, Efficient Sequence Detection for Intersymbol Interference Channels with Run–Length Constraints, IEEE Trans. on Communications, vol. 42, No. 9, Sep. 1994., pp. 2654–2660.

Sheen and Stuber, MLSE Equalization and Decoding for Multipath–Fading Channels, IEEE Trans. on Communications, vol. 39, No. 10, Oct. 1991, pp. 1455–1464.

Haccoun and Kallel, Application of Mutiple Path Sequential Decoding for Intersymbol Interference Reduction Problem, IEE Proceedings I, vol. 138, No. 1, Feb. 1991, pp. 21–31.

Jelinek, *Fast Sequential Decoding Algorithm Using a Stack*, Fast Sequential Decoding, Nov. '69, pp. 675–685.

Raheli, R., *Per–Survivor Processing: A General Approach to MSLE in Uncertain Environments.* , IEEE Transactions on Communications, vol. 43, No. 2/3/4, Feb./Mar./Apr. 1995, pp. 354–364.

Seshadri, N., *Joint Data and Channel Estimation Using Blind Trellis Search Techniques* , IEEE Transactions on Communications, vol. 42, No. 2/3/4, Feb./Mar./Apr. 1994, pp. 1000–1011.

Seshadri, N., *List Viterbi Decoding Algorithms with Applications* , IEEE Transactions on Communications, vol. 42, No. 2/3/4, Feb./Mar./Apr. 1994, pp. 313–322.

(List continued on next page.)

Primary Examiner—Stephen Chin
Assistant Examiner—Michael W. Maddox
Attorney, Agent, or Firm—Jenkens & Gilchrist

[57] ABSTRACT

An improved system and method for maximum likelihood sequence detection where an incoming stream of symbols subjected to intersymbol interference (ISI) are decoded without knowledge of channel coefficients. Through use of improved metrics, the Fano and stack algorithms may be employed to determine the maximum likelihood sequence detection for a given input data stream during blind equalization, offering improved performance over the Viterbi algorithm which requires foreknowledge of the channel coefficients to operate effectively.

19 Claims, 5 Drawing Sheets

OTHER PUBLICATIONS

Verdu and Poor, *Abstract Dynamic Programming Models Unde commutativity Conditions*, Siam J. Control and Optimization, vol. 25, No. 4, Jul. 1987, pp. 990–1006.

Forney, Jr., G. D., *Maximum–Likelihood Sequence Estimation of Digital Sequences in the Presence of Intersymbol Interference*, IEEE Transactions on Information Theory, vol. IT–18, No. 18, No. 3, May 1972, pp. 362–378.

Jelinek, F., *Fast Sequential Decoding Algorithm Using a Stack*, Fast Sequential Decoding, Nov. 1969, pp. 675–685.

Dai and Shwedyk, *Detection of Bandlimited Signals Over Frequency Selective Rayleigh Fading Channels* IEEE Transactions on Communications, vol. 42, No. 2/3/4/, Feb./Mar./Apr. 1994, pp. 941–950.

Zigangirov, K.Sh., *Some Sequential Decoding Procedures*, Problems of Information Transmission, vol. 2, No. 4, Winter 1966, pp. 1–10.

Forney, Jr., G.D., *The Viterbi Algorithm*, Proceedings of the IEEE, vol. 61, No. 3, Mar. 1973, pp. 268–278.

Fano, R.M., *A Heuristric Discussion of Probabilistic Decoding* IEEE Transactions on Infomation Theory, Apr, 1963, pp. 64–74.

FIG. 1

| No | $d(s_k)$ | sequence | | | | | | | | |
|---|---|---|---|---|---|---|---|---|---|---|
| 1 | 0.9931 | −1 | −1 | 1 | 1 | −1 | −1 | −1 | 1 | 1 | 1 |
| 2 | 1.0501 | −1 | 1 | 1 | −1 | −1 | −1 | 1 | 1 | 1 | −1 |
| 3 | 1.2998 | −1 | 1 | 1 | 1 | −1 | −1 | −1 | 1 | 1 | 1 |
| 4 | 1.5328 | −1 | 1 | 1 | −1 | −1 | 1 | 1 | −1 | 1 | −1 |
| 5 | 1.9705 | −1 | 1 | 1 | −1 | −1 | −1 | 1 | −1 | 1 | −1 |
| 6 | 2.0804 | −1 | −1 | −1 | 1 | 1 | −1 | −1 | −1 | 1 | 1 |
| . | . | . | . | . | . | . | . | . | . | . | . |
| . | . | . | . | . | . | . | . | . | . | . | . |
| . | . | . | . | . | . | . | . | . | . | . | . |

SYSTEM AND METHOD FOR SELF-ADAPTIVE MAXIMUM LIKELIHOOD SEQUENCE DETECTION

BACKGROUND OF THE PRESENT INVENTION

1. Field of the Invention

The present invention relates to telecommunications, particularly, to a system and method for improved signal reception, and more particularly to a system and method for improved maximum likelihood sequence detection.

2. Background and Objects of the Present Invention

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which time the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

One technical difficulty encountered in wireless telephonic communications is signal distortion. For example, on top of additive white Gaussian noise (AWGN) the signal is subject to multipath fading. A propagation delay is caused by the multiple propagation paths to a receiver due to buildings or terrain. As a result of time delays across the different paths, a succession of discrete pulses representing symbols transmitted across a communications channel are smeared to the point that they are no longer distinguishable as well-defined pulses at the receiving terminal. Instead, the received symbols overlap somewhat causing intersymbol interference (ISI).

Figure 1:
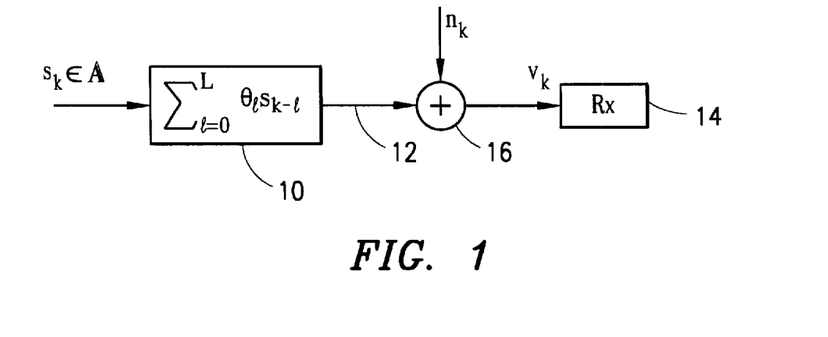
FIG. 1 is a block diagram generally illustrating the introduction of intersymbol interference and other noise into a data stream of symbol characters.

With reference to FIG. 1, there is illustrated a mathematical model of ISI. This is a filter of order L+1, where 'L' is the number of memory elements in the filter and L+1 is the number of filter coefficients $(\theta_0, \ldots \theta_L)$. In particular, a symbol stream of discrete symbols $s_k$, each a member of a defined and finite alphabet A\ forwarded to a given channel of a transmitter 10 having channel coefficients θ combined therein and transmitted. Along the transmission route 12 to a receiver 14 shown in the figure, a noise component $n_k$ is added, represented by an adder 16, altering the symbol stream signal into a different one, e.g., $v_k$, received by the receiver 14.

The process of undoing the effects of ISI is referred to as equalization. To assist in equalizing the aforementioned altered symbol stream received at the receiver 14, digital telecommunications standards employing Time Division Multiple Access (TDMA) technology, like that of the Global System for Mobile communications (GSM) and the IS-136 standards, employ training or synchronization sequences to facilitate signal demodulation. For example, in GSM, systems employ time slots to transmit a 156.25-bit message, where 22 or more of those bits are utilized in training for channel equalization. It should be understood that synchronization is absolutely necessary in certain circumstances, i.e., to initially align the receiver 14 with the transmitter's 10 signal. In conventional systems even after such synchronization occurs, i.e., after establishing timeslot alignment, there is still a need for the training bits in each timeslot. It should be apparent, however, that by minimizing or eliminating the use of these equalization training bits in each time slot, particularly after synchronization has been achieved, this would dramatically increase the information throughput without significant changes to the protocol. In any event, the GSM system utilizes the aforementioned 22 bits as training bits throughout all timeslots of the transmission.

Through use of the training bits, ISI is corrected in current systems by using the training bits for channel equalization, i.e., ascertaining the aforementioned channel coefficients θ for that communications route or link 12 and modifying (demodulating) the incoming signal in accordance with these coefficients. As a result of the dispersive nature of channels across the time domain due to the noise $n_k$, each channel coefficient θ is multiplied with the incoming information, i.e., symbols. It should be understood to those skilled in the art that, with a channel behaving as a filter, the phenomenon of ISI may itself also be modeled as a filter. The length of the filter is the extent of ISI, and is denoted by 'L+1'. Accordingly, in a situation where there is no ISI, the channel may be modeled with a single non-zero channel coefficient, where all other coefficients are zero, e.g., 1,0,0. In this example, channel coefficients characterize the behavior of the channel. Assuming L=2, then with ISI, all of the remaining channel coefficients are non-zero also, e.g., 1, 0.5, 0.2.

Accordingly, a receiver 14 must demodulate the incoming symbol stream, $v_k$, and overcome both the signal dispersion and the background noise present (AWGN). With the conventional channel equalization technique, both ISI and AWGN are overcome by use of the aforementioned training sequence bits. As discussed, having knowledge of a transmission result, i.e., the known training sequence value, one may ascertain what the channel did to the outgoing signal and demodulate the received signal into the appropriate symbols accordingly.

A well-known symbol estimation/detection technique employed to perform maximum likelihood sequence estimation (MLSE) on the input symbol stream is the Viterbi algorithm, which dynamically estimates the most probable sequence of data symbols by maximizing a likelihood function describing the received signal. In general, for a binary system attempting to decipher an N-bit input symbol string, a brute force approach ($2^N$) is computationally infeasible, i.e., it is of exponential order. It should be understood, of course, that for an alphabet of size M, $M^N$ comparisons are required.

The Viterbi algorithm greatly simplifies this exponential order analysis by focusing on a discrete sequence of candidate symbols stored within L memory elements of the filter, i.e., L symbols in length. As an example, for N=156 bits, representing a time burst's binary data information or symbol content, L may be as low as 2, where bounding the analysis to 4 states ($2^2$) is preferred. With the two binary values conventionally represented by +1 and −1, these four states of the filter memory elements are as follows:

| States |
|---|
| −1, −1 |
| −1, +1 |

-continued

| States |
| --- |
| +1, −1 |
| +1, +1 |

In the dynamic programming approach described by the Viterbi algorithm, the incremental shortest path for each state is ascertained, maximizing the likelihood function linearly.

The Viterbi algorithm, although currently the technique of choice in the sequence analysis art, primarily for its linear order computational simplicity, nonetheless has its shortcomings. For instance, the Viterbi algorithm requires foreknowledge of the channel and its coefficients, which in the wireless environment are constantly changing due to channel fading, propagation delays and other signal interference conditions. To adaptively equalize the signal from timeslot to timeslot, the Viterbi algorithm therefore requires the aforementioned training bits, which provide the requisite channel coefficient information enabling the receiver to demodulate the signal dynamically.

Although the Viterbi algorithm operates best in situations where the channel coefficients are known, in "blind" equalization, i.e., where there is no foreknowledge of the channel coefficients and the algorithm must adapt itself to the conditions present, utilizations of the Viterbi algorithm have proved suboptimal. It should, therefore, be understood that by requiring foreknowledge of the channel coefficients Viterbi algorithms are not well suited for a self-adaptive sequence detection technique, particularly in the blind equalization context, and alternative methodologies are required in such instances. One such alternative, the Fano algorithm, although conventionally used primarily in the context of convolutional code decoding, is set forth and utilized in the present invention. Another alternative, the stack algorithm, is also described.

It is, accordingly, apparent that dynamic programming techniques, such as those utilizing Viterbi algorithms, are infeasible for implementing sequential self-adaptive equalization techniques.

It is, therefore, an object of the present invention to provide an improved maximum likelihood sequence estimation/detection technique and methodology for implementing self-adaptive equalization.

It is a further object of the present invention that the aforesaid improved technique determine the transmitted symbol sequence without using a training sequence to estimate the channel coefficient parameters that are used to model the unknown intersymbol interference (ISI).

It is also an object of the present invention that the improved technique employ recursive techniques.

SUMMARY OF THE INVENTION

The present invention is directed to an improved system and method for maximum likelihood sequence detection where an incoming stream of symbols subjected to intersymbol interference (ISI) are decoded without knowledge of channel coefficients. Through use of improved metrics, the Fano and stack algorithms may be employed to determine the maximum likelihood sequence detection for a given input data stream during blind equalization, offering improved performance over the Viterbi algorithm which requires foreknowledge of the channel coefficients to operate effectively.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Many techniques have been devised to overcome the problems associated with intersymbol interference or ISI. As discussed, when the channel and its particular coefficients $\theta$ are known, sequential estimation algorithms such as a Viterbi algorithm are optimally utilized for maximum likelihood sequence estimation (MLSE), i.e., dynamically estimating the most probable sequence of data symbols by maximizing the likelihood function of the received signal. Algorithms, such as Viterbi's, however, are optimum only if the channel coefficients $\theta$ for the transmission channel are known, particularly if a metric that arises from MLSE can be implemented recursively. It should be understood that a "metric" in this art means a measure of goodness. For the aforementioned Viterbi and other algorithms, a metric is an indication of the probability of a path being taken given the demodulated symbol sequence.

In Viterbi's algorithm, the last L symbols describe the "state" a particular symbol sequence is in. Only one sequence is retained per state. A key idea in this methodology is that it is necessary to compute the metric for each state at the $k^{th}$ stage given that each preceding k–1 state is a known "survivor". In this manner, knowledge of the past L symbols is needed to decide the survivors or most likely sequences for the next stage, incrementally advancing such as across nodes in an enumeration or decision tree without backtracking.

In more detail, the most likely sequence is the one that maximizes the joint probability density function (jpdf) of the observation v given the transmitted sequence and the channel coefficients:

$$p(v|s, \theta) = \prod_{k=1}^{N+L} p(v_k|s_k, s_{sk-1}, \ldots, s_{k-L}, \theta_0, \ldots, \theta_L) \quad (1)$$

Assuming that the noise is Gaussian, the jpdf may be explicitly written in (1) as:

$$p(v|s, \theta) = \prod_{k=1}^{N+L} \frac{1}{\sqrt{2\pi\sigma^2}} \exp\left(-\frac{1}{2\sigma^2}\left|v_k - \sum_{l=0}^{L} \theta_l s_{k-l}\right|^2\right) \quad (2)$$

It should, therefore, be understood that the sequence that maximizes (2) also maximizes the log of the density function. Taking the log yields the likelihood expression which allows simplification of the exponential term. Maximizing this expression over all sequences s yields the maximum likelihood sequence estimate. Let ŝ denote the estimated sequence and s and v are vectors comprising the input symbols and observations, respectively. The most likely sequence can then be estimated by minimizing:

$$\hat{s} = \arg\min_{s_1, s_2, \ldots s_N} \sum_{k=1}^{N+L} \left|v_k - \sum_{l=0}^{L} \theta_l s_{k-l}\right|^2 \quad (3)$$

$$= \arg\min_{s} \|v - S\theta\|^2$$

Where S is an (N+L)×(L++1) matrix whose columns are shifted versions of s. The Viterbi algorithm set forth below can be used to find the most likely sequence. When the channel coefficients θ are unknown, they can be estimated, e.g., for 'k' observations:

$$\theta_k = (S_k S_k)^{-1} S_k v_k \quad (4)$$

This criterion may be reformulated by replacing the estimate of θ from (4) in (3):

$$\hat{s}_k = \arg\min_{s_k} \|v_k - S_k(S_k S_k)^{-1} S_k v_k\|^2 \quad (5)$$

When the channel coefficients θ are unknown, an estimating metric can be constructed as follows:

$$\hat{s}_k = \arg\min_{s_k} d(s_k) \quad (6)$$

and $d(s_k) = \|v_k\|^2 - v'_k P_{S_k} v_k$ where $P_{S_k} = S_k(S'_k S_k)^{-1} S'_k$ and $Ps_k = S_k(S'_k S_k)^{-1} S'_k$ is the projection matrix. Among all possible input sequences, the one which minimizes the metric in (6) is sought. The optimal sequence is the one that spans the signal sub-space containing the largest portion of the received signal energy. Since this metric (6) includes the nonlinear quantity $(S'_k S_k)^{-1}$, which cannot be written in an additive form, a metric for self-adaptive equalization using this quantity depends upon the whole N-bit sequence and not just the last L symbols. This, in turn, implies that the concept of a "state variable" is no longer useful, and that a principle known as Bellman's principle of optimality does not apply to self-adaptive MLSE. As will be apparent, good surviving sequences ending in the same "state" in a tree-search are discarded when using this approach.

Figure 2:
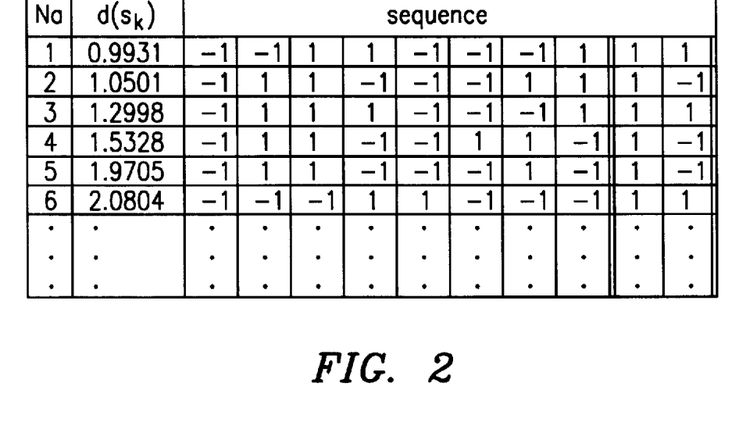
FIG. 2 illustrates a table of values obtained in accordance with a conventional maximum likelihood sequence estimation (MLSE) technique, employing a global search.

An example of this problem of self-adaptive MLSE is shown in the table of values in FIG. 2 in which sequences of length N=10 are analyzed by computing the metric $d(s_k)$ for each possible sequence and sorting them. In this example, L=2, i.e., only the last 2 symbols are considered. With particular reference to the last and rightmost two values (or state) of the respective sequences, delineated by the double bars, it is apparent that sequences numbered 1, 3 and 6 in FIG. 1 end in the same state, i.e., (1,1). Pursuant to the conventional dynamic programming algorithms, such as Viterbi's, the sequences numbered 3 and 6 are discarded and eliminated from further consideration in favor of the first, arbitrarily chosen sequence. Similarly, sequences 4 and 5 are dropped in favor of the sequence numbered 2. In this manner good interim surviving sequences ending in the same state are lost in the early stages of the algorithm. As is understood by those skilled in the art, this elimination technique is not justified by the principle of optimality and dynamic programming is, therefore, a distinctly suboptimal technique.

As discussed, dynamic programming techniques for resolving intersymbol interference (ISI), such as Viterbi algorithms, are not feasible for implementing sequential self-adaptive equalization techniques, where the channel coefficients are unknown.

Instead, the present invention is directed to the use of the Fano and stack algorithms in the context of maximum likelihood sequence estimation/detection. Although the Fano and stack algorithms have been conventionally used for MLSE when the channel coefficients are known, they have not been used in the blind equalization context. In other words, although Fano and stack (and Viterbi) techniques have been utilized primarily for decoding convolutional codes, the Fano and stack algorithms have not been applied to the problem of self-adaptive sequence estimation/detection as set forth in more detail herein.

Figure 3:
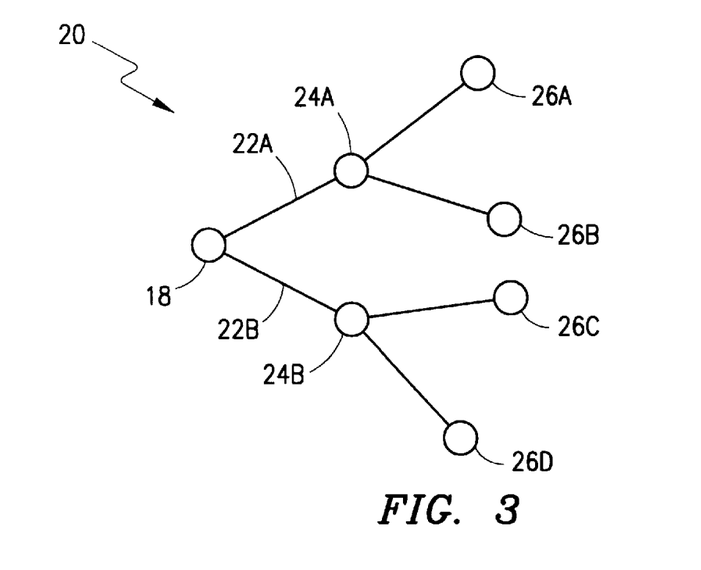
FIG. 3 illustrates an enumeration tree structure such as used in implementing the methodology of the present invention.

It should nonetheless be understood that the Fano and stack algorithms are termed "tree-search" rather than a conventional trellis search (Viterbi's algorithm) since the most likely sequence is searched by traversing an enumeration tree, such as generally illustrated in FIG. 3. Tree search algorithms have a root node 18 at the beginning of the tree, generally referred to by the reference numeral 20, which splits into branches 22A and 22B to branch nodes 24A and 24B, respectively, which in turn subbranch into other nodes which may be leaf nodes 26A–D. What differentiates the particular tree search algorithm is the manner in which the algorithm traverses the tree, and the Fano and stack algorithms traverse the nodes of the enumeration tree differently. For example, the stack algorithm keeps a stack of candidate sequences and does not allow backtracking while the Fano algorithm utilizes backtracking but keeps track of only one candidate sequence at a time.

With reference again to the block diagram in FIG. 1, in an effort to simplify the model for ISI, the special case of a discrete-time finite-state Markov process is considered, where a sequence of equally likely symbols $s_k$ drawn from the discrete and finite alphabet A\ is input to a channel. This models the ISI which can be represented by a finite impulse response filter whose coefficients are $\theta_l$, where $l=0 \ldots L$. As is understood to one skilled in this art, a larger value of L implies a greater length of intersymbol interference for analysis. For slowly varying mobile radio channels, channel coefficients are assumed to be unknown but constant. In the channel model shown in FIG. 1, the goal is to determine the most likely input sequence received by receiver 14 out of the $M^N$ possible candidate sequences where M is the alphabet size and N is the sequence length.

As discussed, although the Viterbi algorithm is best suited for MLSE when the channel coefficients are known, this dynamic programming framework is unsuitable for self-adaptive equalization. Also, since the value for $M^N$ may be quite large, e.g., M may be several dozen or more characters in the alphabet and N=10 as in the above example, a brute force solution technique to perform a global search is, infeasible due to the exponential order of complexity. Consequently, a system and method that can approximate such a global search is needed, and tree-search algorithms are a practical tool for this. The metric for these algorithms differ, however, from that shown in (6), as described below.

In brief, the Fano algorithm, the preferred methodology in the present invention, traces the single most likely path through a tree, such as the tree 20 in FIG. 3. At each node encountered, e.g., nodes 18, 24A 24B or 26A–D, a metric or probability estimate is calculated and compared with a running threshold, which is based upon an expected metric value. If the calculated metric satisfies the threshold, the path continues down that "branch". Otherwise, the path is retraced and an alternative is sought. If no such alternative is found, then the original path is continued at a lower threshold. The threshold is incremented or decremented depending on whether it is loosened or tightened in steps of size $\Delta$.

Figure 4:
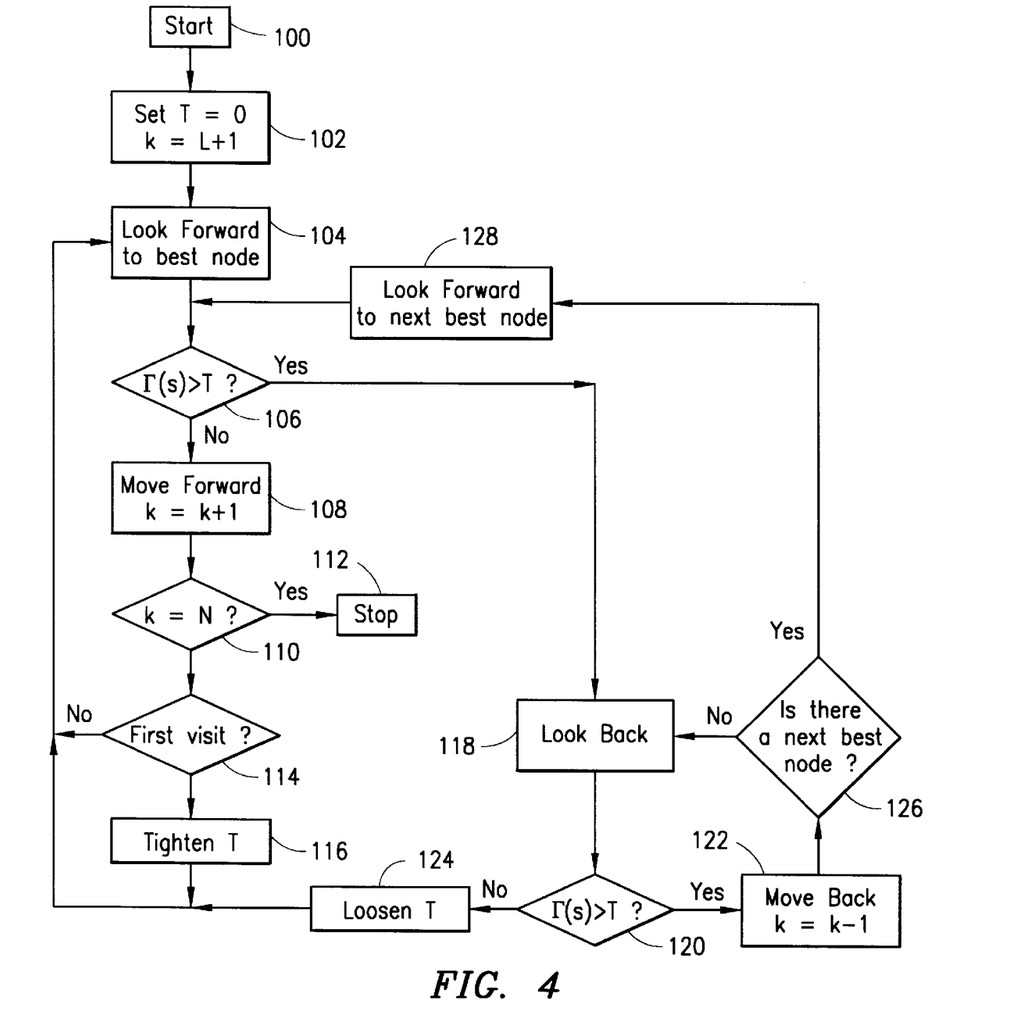
FIG. 4 is a flow diagram illustrating steps utilized in implementing the Fano algorithm.

With particular reference now to FIG. 4, there is illustrated a methodology for implementing the Fano algorithm. The input data stream of symbols subject to ISI is received (step 100) and some dynamic variables are set (step 102), e.g., the aforementioned running threshold (T) based on the expected metric value, and a data stream positional counter k, which ranges from L+1 the first unknown symbol position in the data stream, to N, the input data stream terminus. The method then looks forward to the best of the succeeding nodes (step 104) and checks whether the running threshold is satisfied (step 106), i.e., whether the metric $\Gamma(s_k)$ is greater than the running threshold T, indicating an increased probability of error. If not, then the method moves forward (step 108) along the input data stream to the next symbol candidate for analysis, incrementing the positional counter k accordingly. If the running threshold is satisfied, then the method looks back (step 118), discussed further herein.

After moving forward (step 108), the method determines whether the input data stream terminus or "leaf" node of the tree has been reached, i.e., whether k=N (step 110). If so, then the method stops (step 112). If not, then the method checks whether the present node under consideration has been visited (step 114). If so, then the running threshold has yet to be satisfied and must be tightened (step 116). If, however, this is the first visit to that node, then control shifts to step 104 to look forward again. Also, after tightening the running threshold (step 116), control also transfers back to step 104.

With further reference to FIG. 4, particularly step 106, if the running threshold T is not satisfied, control transfers to step 118, as discussed, where the method looks back to the preceding node and compares its metric with the running threshold T (step 120). If the threshold is satisfied, then the positional counter k is decremented to move back up the tree (step 122). If not, then the running threshold T must be loosened (step 124) and control transferred back to step 104. After moving back (step 122), a determination is made whether there is a next best node (step 126). If there is, then the method looks forward for the next best node (step 128) and control transfers to step 106, discussed above. If there is no next best node, then the method looks back (step 118), as discussed.

The metric for the Fano algorithm should provide a criterion for backtracking. The following metric is proposed:

$$v_k'Q_{s_k}v_k = \|v_k\|^2 - v_k'P_{s_k}v_k, \quad (7)$$

In this criterion, the energy in the noise subspace ($N_x$) is minimized, where $Q_{s_k} = I_k - P_{s_k}$ is the projection matrix orthogonal to the signal subspace. The interpretation is that the sequence with the minimum possible energy in the noise subspace is the most likely sequence.

For the preferred Fano algorithm, this metric has to be compared with a running threshold. As discussed, the running threshold can be computed based on the expected value of the metric in (7). The expected value of $v_k'Q_{s_k}v_k$, given the transmitted sequence, where $v_k = S_k\theta + n_k$, is:

$$E[v_k'Q_{s_k}v_k] = E[n_kQ_{s_k}n_k + 2n_kQ_{s_k}S_k\theta] = (k-L-1)\sigma^2 \text{ for } k>L+1 \quad (8)$$

In arriving at (8), the fact that $Q_{s_k}S_k = 0$ and $n_k'Q_{s_k}n_k$ is $X^2$ with k–L–1 degrees of freedom is used, and $Q_{s_k}$ has rank k–L–1, as is understood in this art.

Figure 5:
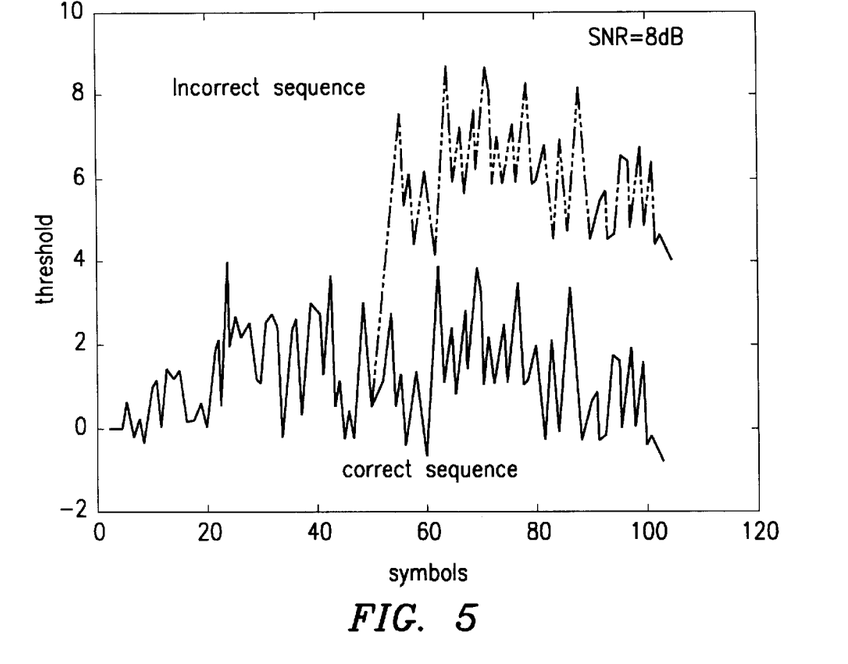
FIG. 5 is a chart illustrating threshold values for a correct sequence and an incorrect sequence using the methodology of the present invention.

Therefore, $v_k'Q_{s_k}v_k$ can be approximated by the threshold: $(k-L-1)\sigma^2$. In FIG. 5, the difference value $\Gamma(s_k) = |v_k'Q_{s_k}v_k - (k-L-1)\sigma^2|$ increases sharply in the case of an incorrect sequence, shown in dashed line, while it remains close to zero for the correct sequence, shown in solid line. Therefore the proposed metric is $\Gamma(s_k) = |v_k'Q_{s_k}v_k - (k-L-1)\sigma^2|$, for k>L+1.

In another embodiment of the present invention a well-known stack algorithm (also a tree search algorithm) is illustrated herein to compare sequences of unequal lengths, and if the metric $\Gamma(s_k) = v_k'Q_{s_k}v_k$ is employed, then the algorithm is biased towards the sequence that grows in length more rapidly. In the present invention, a "normalized threshold" is proposed to decide between sequences of unequal lengths. Accordingly, for $v_k = S_k\theta + n_k$:

$$E[v_k'Q_{s_k}v_k] = E[n_k'Q_{s_k}n_k] + E[n_k'Q_{s_k}S_k\theta] + \theta'S_k'Q_{s_k}S_k\theta = (k-L-1)\sigma^2 \quad (9)$$

where $E[n_k'Q_{s_k}n_k] = (k-L-1)\sigma^2$ grows proportionally with k and $\theta'S_k'Q_{s_k}S_k\theta = 0$ and $E[n_k'Q_{s_k}S_k\theta] = 0$. Therefore, the quantity:

$$\frac{v_k'Q_{s_k}v_k}{k-L-1} \quad (10)$$

Figure 6:
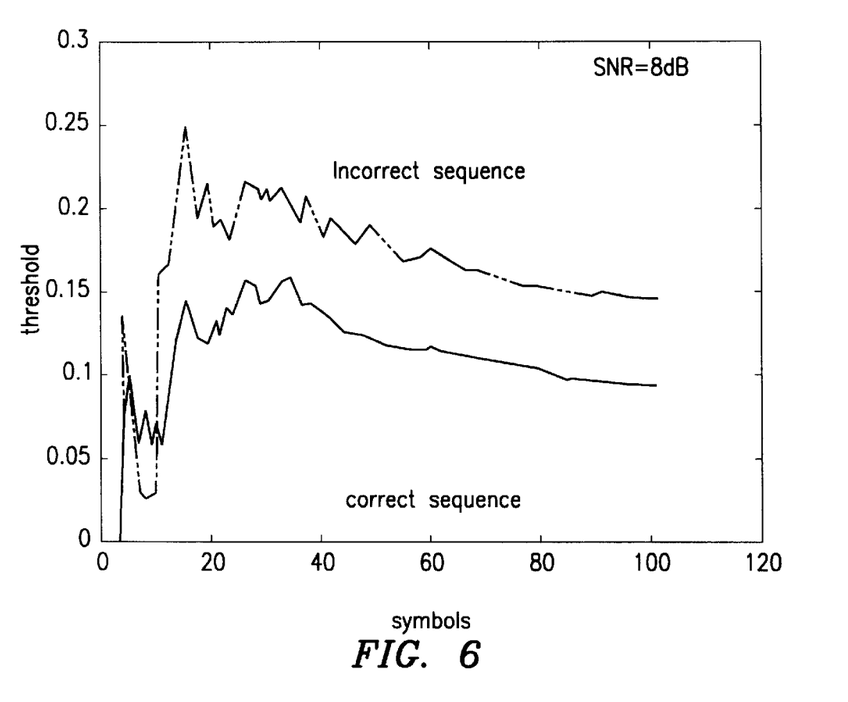
FIG. 6 is a chart illustrating comparison threshold values for a correct sequence and an incorrect sequence using a stack algorithm.

Is employed to track the threshold. Here $v_k$ is the vector of the first k observations and $Q_{s_k}$ is the orthogonal projection matrix for sequences of length k, as is understood in the art. This stack algorithm metric is plotted in FIG. 6, which illustrates that for small symbol sequence lengths there is a possibility that the metric of an incorrect sequence, again shown in dashed line, appears to be better than the metric of the correct sequence, shown in solid line. This is a problem inherent with the stack algorithm and which is obvious in simulation results. Nonetheless, the stack algorithm may be useful in numerous MLSE applications where the preferred Fano algorithm is suboptimal.

Figure 7:
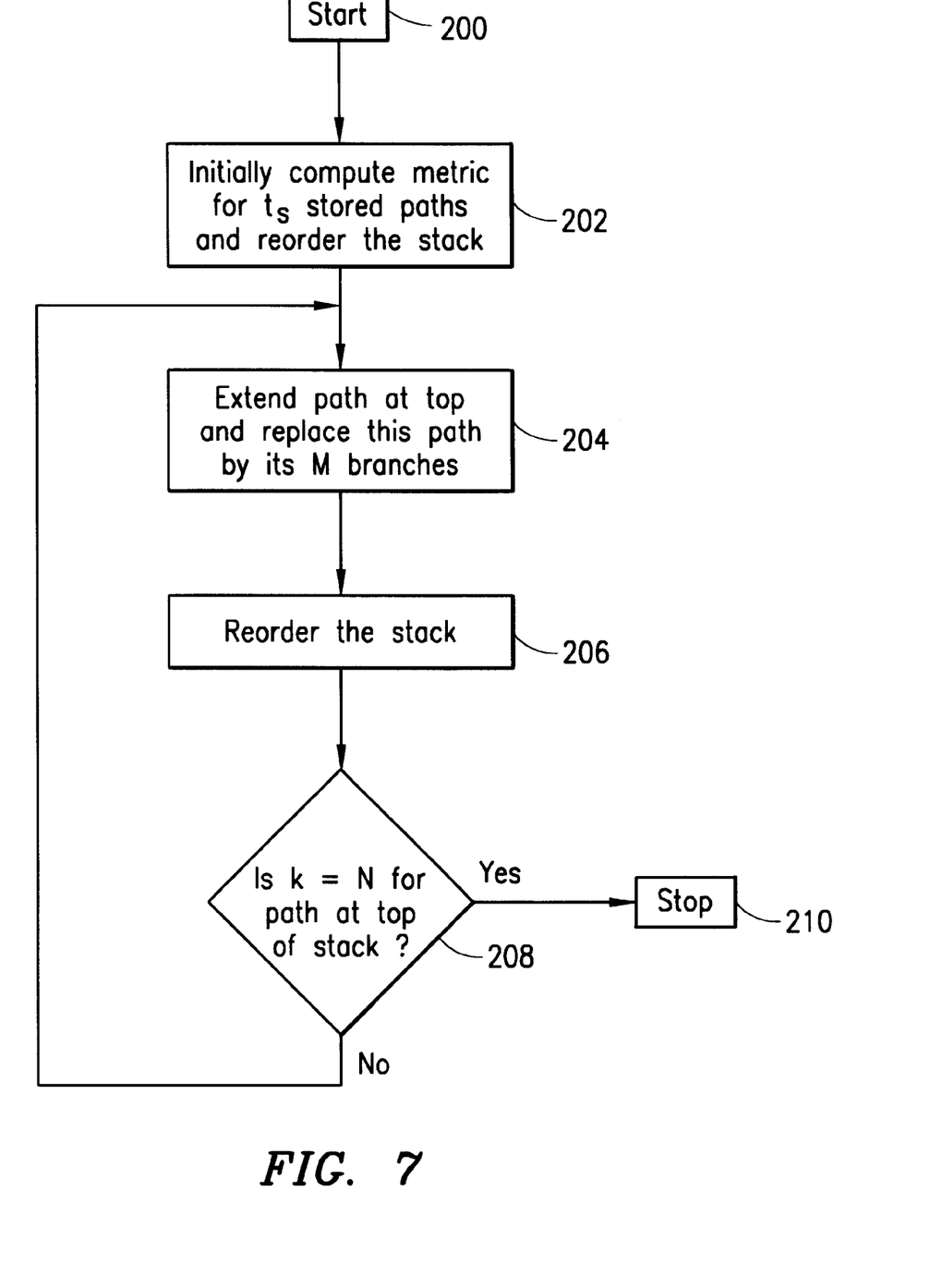
FIG. 7 is a flow diagram implementing the stack algorithm.

With reference now to FIG. 7 there is illustrated a flow chart for implementing the recursive stack algorithm of the present invention. Instead the stack algorithm, although similar to the Fano algorithm set forth above, differs by not allowing backtracking. The stack algorithm after starting (step 200) calculates a stack of $t_s$ possible sequences, where the metrics of the $t_s$ stored paths are computed and all of the examined paths are stored in decreasing order of their metric values (step 202). The top of the stack, therefore, corresponds to the path having the current highest metric. This most likely path is then explored one step further. In particular, after loading the root node 18 onto the stack, the path is extended at the top to M branches and the metrics are updated accordingly. The top node is, therefore, replaced by the M branches (step 204) and the stack reordered pursuant to the updated metrics (step 206). If a counter k is equal to N (step 208), then the sequence which maximizes the metric is output as the maximum likelihood sequence detected and the method ends (step 210). Otherwise, control reverts back to step 204 for further stack manipulations.

Figure 8:
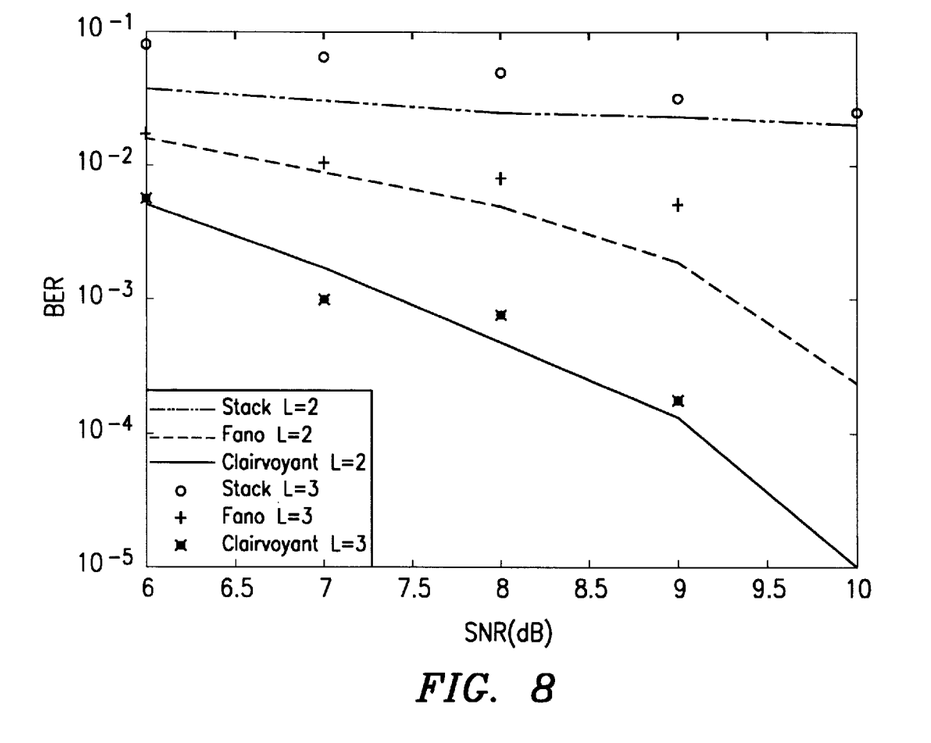
FIG. 8 is a chart comparatively illustrating bit error rates for the Fano and stack algorithms with a clairvoyant technique.

The bit error rate (BER) performance of the preferred Fano and stack algorithms may be compared with a clairvoyant detector (that has knowledge of the channel parameters). FIG. 8 shows the BER for the stack and Fano algorithm for different channel orders (L=2,3).

As is apparent from FIG. 8, the Fano algorithm performs better than the stack algorithm, but at the cost of a greater processing delay. The step size, however, can be adjusted to trade-off the processing delay with the BER. Although the stack algorithm requires a lesser delay, it performs less optimally than the Fano algorithm.

The previous description is of a preferred embodiment for implementing the invention, and the scope of the invention should not necessarily be limited by this description. The scope of the present invention is instead defined by the following claims.

What is claimed is:

1. A self-adaptive maximum likelihood sequence detector for self-adaptively detecting a maximum likelihood sequence of symbols within a transmitted input data stream without knowledge of respective channel coefficients, said symbols being subject to intersymbol interference during transmission, said detector comprising:

construction means for constructing an enumeration tree of nodes for a given sequence of said input data stream containing symbols, said enumeration tree having a root node and a plurality of branch nodes connected thereto, said enumeration tree enumerating respective paths for the symbols within said given sequence;

computation means for computing at each node a respective metric value associated with said given sequence of said symbols, said computation means employing a metric; and self-adaptive traversing means for self-adaptively traversing said enumeration tree from said root node to a terminating leaf node, said traversing means at each said node having said computation means determine said respective metric value associated with said given sequence, said self-adaptive traversing means comparing said respective metric value with a running threshold and proceeding through the respective nodes from said root node to said terminating leaf node pursuant to said comparison, whereby upon traversal of said enumeration tree a particular one of said paths represents the maximum likelihood sequence for said given sequence.

2. The detector according to claim 1, wherein said self-adaptive traversing means further comprises backtracking means for backtracking to a previous node within said enumeration tree, said self-adaptive traversing means engaging said backtracking means when said respective metric value exceeds said running threshold.

3. The detector according to claim 2, wherein said running threshold is loosened prior to said computation means determining said respective metric value associated with said previous node.

4. The detector according to claim 1, wherein said running threshold is tightened after said self-adaptive traversing means determines that said respective metric value is less than or equal to said running threshold.

5. The detector according to claim 1, wherein said metric is based on a Fano algorithm.

6. The detector according to claim 1, wherein said self-adaptive traversing means further comprises stacking means for storing a multiplicity of said paths from a given node through said enumeration tree, each respective path comprising a respective sequence of said symbols, said computation means computing respective metric values for each said multiplicity of paths from said given node and ordering said multiplicity of paths within said stacking means pursuant to the respective metric values associated therewith, said respective path having the highest metric value being selected.

7. The detector according to claim 6, wherein, after the selection of said highest metric respective path corresponding to said given node, said stacking means stores a multiplicity of paths from a branch node of said given node, said computation means computes the respective metric values for each path from said branch node and orders said multiplicity of paths within said stacking means pursuant to the respective metric values associated therewith, said respective path having the highest metric being selected.

8. The detector according to claim 1, wherein said enumeration tree is a binary tree.

9. A method for determining a self-adaptive maximum likelihood sequence of symbols within a transmitted data stream without knowledge of respective channel coefficients, said symbols being subject to intersymbol interference during transmission, said method comprising the steps of:

(a) constructing, within a receiver in a telecommunications system, an enumeration tree of nodes for a given sequence of said input data stream containing symbols, said enumeration tree having a root node and a plurality of branch nodes connected thereto, said enumeration tree enumerating respective paths for the symbols within said given sequence;

(b) computing, at a particular node within said enumeration tree, a respective metric value associated with said given sequence of said symbols, said respective metric value being computed using a metric;

(c) comparing said respective metric value to a running threshold;

(d) self-adaptively advancing from said particular node to another node within said enumeration tree when said respective metric value is less than or equal to said running threshold, and self-adaptively backtracking from said particular node to a parent node when said respective metric value exceeds said running threshold; and (e) repeating steps (b)–(d) until said another node is a terminating leaf node within said enumeration tree.

10. The method according to claim 9, wherein, after self-adaptively backtracking to said parent node, said running threshold is loosened.

11. The method according to claim 9, wherein, after self-adaptively advancing to said another node, said running threshold is tightened.

12. The method according to claim 9, wherein said method is based on a Fano algorithm.

13. The method according to claim 9, further comprising after step (a) and before step (b):

storing a multiplicity of said paths from said particular node through said enumeration tree, said computing step of computing the respective metric values associated with each of said multiplicity of paths, and after step (b) and before step (c):

ordering said multiplicity of paths pursuant to the respective metric values associated therewith, said step of comparing using the highest of said respective metric values in the comparison with said running threshold.

14. The method according to claim 13, wherein said method is based on a stack algorithm.

15. A telecommunications system comprising:

a transmitter for transmitting a data stream of discrete symbols;

a receiver, in communication with said transmitter, for receiving said symbol data stream from said transmitter, said symbols being subject to intersymbol interference during transmission from said transmitter;

a self-adaptive maximum likelihood sequence detector, attached to said receiver, for self-adaptively detecting a maximum likelihood sequence of symbols for a given sequence of said received data stream without knowledge of respective channel coefficients, said detector employing an enumeration tree of nodes for determining self-adaptive said maximum likelihood symbols sequence;

computation means for computing at each node a respective metric value associated with said given sequence of said symbols, said computation means employing a metric; and self-adaptive traversing means for self-adaptively traversing said self-adaptive enumeration tree from a root node to a terminating leaf node, said traversing means at each said node having said computation means determine said respective metric value associated with said given sequence, said self-adaptive traversing means comparing said respective metric value with a running threshold and proceeding through the respective nodes from said root node to said terminating leaf node pursuant to said comparison, whereby upon traversal of said enumeration tree a particular one of said paths represents the self-adaptive maximum likelihood sequence for said given sequence.

16. The telecommunications system according to claim 15, wherein said self-adaptive traversing means further comprises self-adaptive backtracking means for self-adaptively backtracking to a previous node within said enumeration tree, said self-adaptive traversing means engaging said self-adaptive backtracking means when said respective metric value exceeds said running threshold.

17. The telecommunications system according to claim 16, wherein said running threshold is loosened prior to said computation means determining said respective metric value associated with said previous node.

18. The telecommunications system according to claim 15, wherein said running threshold is tightened after said self-adaptive traversing means determines that said respective metric value is less than or equal to said running threshold.

19. The telecommunications system according to claim 15, wherein said self-adaptive traversing means further comprises stacking means for storing a multiplicity of said paths from a given node through said enumeration tree, each respective path comprising a respective sequence of said symbols, said computation means computing respective metric values for each said multiplicity of paths from said given node and ordering said multiplicity of paths within said stacking means pursuant to the respective metric values associated therewith, said respective path having the highest metric value being selected.

* * * * *